United States Patent [19]

Smith

[11] 4,205,565

[45] Jun. 3, 1980

[54] TIRE REPAIR APPARATUS AND METHOD

[76] Inventor: James L. Smith, 6327 Thornhedge Dr., Riverdale, Ga. 30296

[21] Appl. No.: 896,686

[22] Filed: Apr. 17, 1978

[51] Int. Cl.² .............................................. B60C 25/16
[52] U.S. Cl. .................................................... 81/15.7
[58] Field of Search ...................... 81/15.2, 15.5, 15.7

[56] References Cited

U.S. PATENT DOCUMENTS

| | | |
|---|---|---|
| 567,402 | 9/1896 | Moomy . |
| 611,972 | 10/1898 | Meeker . |
| 2,804,792 | 9/1957 | Westfall . |
| 2,966,189 | 12/1960 | Chambers et al. . |
| 2,990,736 | 7/1961 | Crandall ................................ 81/15.7 |
| 3,034,206 | 5/1962 | Kominic ............................ 81/15.7 X |
| 3,625,094 | 12/1971 | Garrison . |
| 3,714,851 | 2/1973 | Orser . |
| 4,009,624 | 3/1977 | Nishino . |

*Primary Examiner*—James G. Smith
*Attorney, Agent, or Firm*—Jones, Thomas & Askew

[57] ABSTRACT

The improved tire repair device includes a disposable protective tip which protects a plug being inserted into a tubeless tire from damage caused by belts under the tire tread, especially by steel belts. The tip is cone-shaped and is optionally constructed of flexible material in a manner which allows the tip to collapse to conform to the size and shape of small injuries to the tire.

8 Claims, 7 Drawing Figures

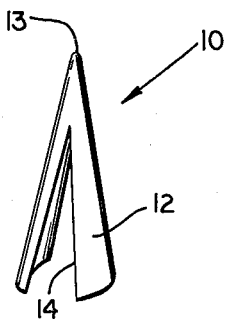
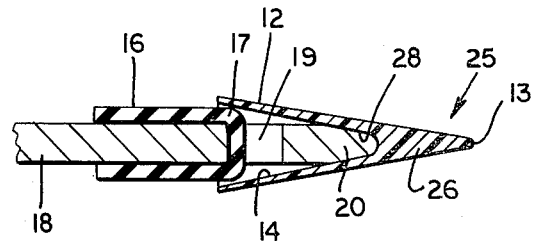
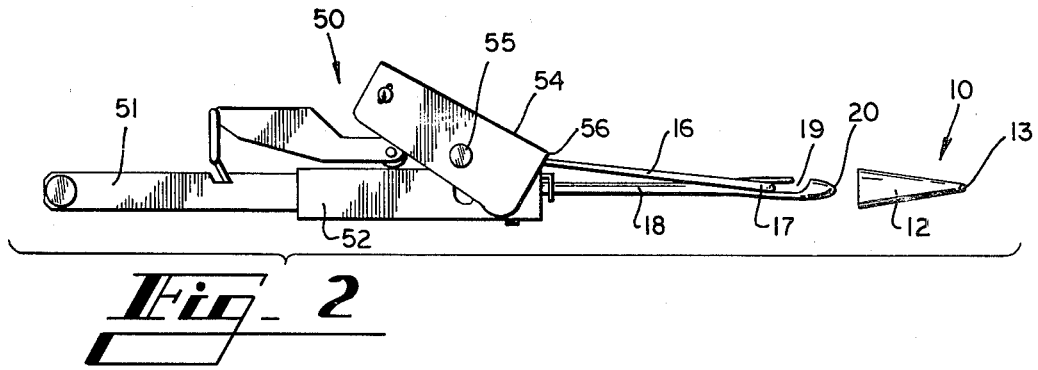
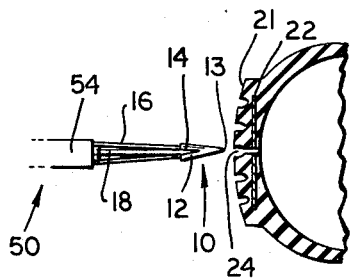
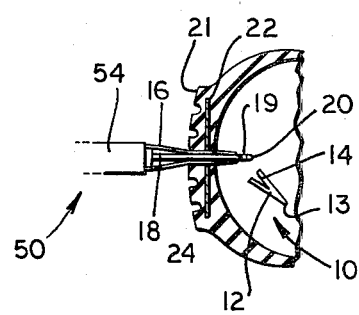
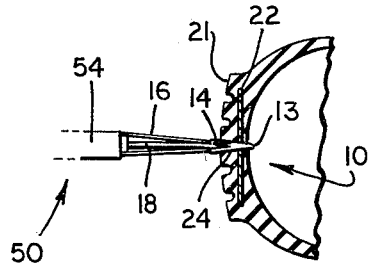
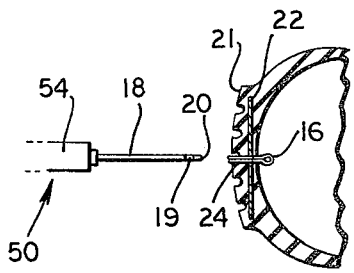

TIRE REPAIR APPARATUS AND METHOD

BACKGROUND OF THE INVENTION

The invention herein described relates to devices for repairing injuries in tubeless tires and, in particular, to the repair of tubeless tires having belts under the tread thereof constructed of stiff materials such as steel.

Tubeless tires which have been punctured usually are repaired by inserting into the injury in the tire a flexible plug having a diameter larger than the diameter of the injury. One such plug is shown in U.S. Pat. No. 2,966,189, issued to Chambers et al.

An apparatus for inserting such plugs into early tubeless tires is disclosed in U.S. Pat. No. 3,714,851, issued to Orser. A device of the type disclosed in Orser is more convenient than prior plug inserters because a user merely hooks the plug into the eye of a needle, stretches the plug along the sides of the needle using a clamping apparatus built into the device, inserts the needle carrying the plug into the injury of the tire, releases the clamping mechanism and withdraws the needle. Problems have arisen, however, with prior art devices of this general type which are used to repair tubeless tires having stiff belts such as steel underneath the tread. As the needle passes through the injury in the belt, the stretched plug tends to be sheared off by the steel belt at the exposed shoulders of the plug where it emerges from the eyelet of the needle. The initial response to this problem appears to have been to form the plug of tougher material to withstand the shearing edge of the steel belts. A disadvantage of this approach has been that a gain in toughness has been accompanied by a loss in flexibility in these new plugs which do not seal as well as more vulnerable plugs.

The prior art indicates that attempts have been made in connection with other types of plug insertion devices to shield and guide a plug through an injury in a tire. Examples of such prior art include U.S. Pat. No. 4,009,624, U.S. Pat. No. 611,972, and U.S. Pat. No. 567,402. However, tools of the older prior art disclosures appear to be less convenient to manipulate and in some instances more than one tool is required to accomplish the plugging function. Furthermore, it appears that the rigidly shaped protective sleeves for plug inserters of the prior art require that a small injury be enlarged to the diameter of the sleeve in order that the sleeve may be passed through the puncture. Although this may have been a simple matter when repairing early tubeless tires, the mesh of present day steel belts is very stiff and resistant to attempts to enlarge injuries through the belt.

SUMMARY OF THE INVENTION

The present invention solves the problem of shielding the plug from the shearing effect found in belted tires while retaining the convenience and ease of use of a plug insertion tool. The invention provides, a tubeless tire repair tool including a needle defining an eyelet therein for carrying a flexible plug, and a means for shielding the plug where the plug emerges from the eyelet. The shielding means disclosed herein is a disposable protective tip for use with such a tubeless tire repair tool, the tip comprising a cone-shaped member and which optionally is flexible and collapsible to conform to the size and shape of the injury in the tire. The tip collapses by means of at least one slit extending from the base of the cone-shaped member toward the vertex of the cone.

In the method of repairing a tubeless tire utilizing the present invention, the tip is placed over the end of the needle to cover the plug where the plug emerges from the eyelet of the needle, the tool and tip assembly is inserted into the injury of the tire, the tip is dropped into the interior of the tire, and the needle is withdrawn leaving the plug in place within the injury.

Thus, it is an object of the present invention to provide protection for a tire repair plug being inserted into a tire by a needle-type plug inserter.

Another object of the present invention is to provide a disposable, collapsible protective tip for a tire repair tool which protects the plug being inserted into the puncture of a tire from damage by the stiff belts underneath the tread of the tire and which is collapsible to conform to the shape of the injury in the tire.

Another object of this invention is to provide the combination of a needle-type plug inserter and a protective tip which are used to insert a flexible plug into a puncture of an automobile tire and the like.

Another object of this invention is to provide a method and apparatus for repairing punctured tires.

Other objects, features and advantages of the invention will become apparent upon reading the following description of the invention when compared with the accompanying drawings.

BRIEF DESCRIPTION OF THE DRAWING

FIG. 1 is a pictorial view of a protective tip according to the present invention.

FIG. 2 is a side plan view of a needle-type plug insertion device with a protective tip according to the present invention ready to be placed over the tip of the needle.

FIGS. 3–6 are diagrams depicting the sequence of inserting a repair plug into a tubeless tire using an insertion tool incorporating a protective tip according to the present invention.

FIG. 7 is a horizontal cross-sectional view of a second embodiment of a protective tip according to the present invention.

DETAILED DESCRIPTION OF THE INVENTION

Referring now in more detail to the drawing, in which like numerals refer to like parts throughout the several views, FIG. 1 depicts a protective tip 10 according to the present invention for use with a tire repair tool of the type shown in FIG. 2. The protective tip 10 is formed in the shape of a cone having a curved wall 12 and a or leading end point vertex 13. In the preferred embodiment, the cone 10 also includes at least one slit 14 in the wall 12 extending from the base of the cone toward the vertex 13. As shown in FIG. 1, the protective tip 10 includes two V-shaped slits 14 which are situated opposite from one another. The vertex 13 of the tip is slightly blunted to avoid accidentally causing additional injury to the tire.

FIG. 2 shows an example of a needle plug injection tool 50 which includes a handle 51 upon which is slidably mounted a housing 52 carrying a clamp mechanism 54 pivoted about a pivot pin 55. The handle 51 also carries a needle 18 defining an eyelet 19 therein near the end 20 of the needle 18. A tire repair plug 16 is fitted into the eyelet 19 of the needle 18. The free ends of the plug 16 are then fixed by the clamp 54 at point 56 and the plug 16 is stretched into an elongate form lying along each side of the needle 18, forming shoulders 17 where the plug emerges from the eyelet 19.

The protective tip 10 is shown in FIG. 2 ready to be placed over the end 20 and the eyelet 19 of the needle 18 in order to protect the vulnerable shoulders 17 of the plug 16 where the plug emerges from the eyelet 19. A top view of the protective tip 10 in position over the tip of the needle 18 is shown in FIG. 3. FIG. 3 also shows diagrammatically a tubeless tire 21 including a steel belt 22 lying under the tread of the tire 21, and an injury 24 through the tread and the belt. Prior to repairing the injury, the plug, needle, protective tip and tire in the area of the injury are coated with a lubricating cement as is known in the art.

In operation, the use of the protective tip 10 follows the sequence shown in FIGS. 3–6. With the plug 16 stretched from the eyelet 19 along the needle 18, and the protective tip 10 in position as in FIG. 3, the needle is inserted into the injury 24. It will be noted that sharp edges of the steel belt 22 form part of the injury 24. In the absence of the protective tip 10 of the present invention, the stretched plug 16 could be sheared off at the shoulders 17 as the needle 18 was forced through the injury 24. However, the walls 12 of the protective tip 10 are of sufficient length to cover the shoulders 17 and therefore to prevent the plug 16 from being sheared by the steel belt 22.

When the needle 18 has been inserted fully into the tire 21, as shown in FIG. 5, the protective tip 10 drops into the interior of the tire, where it remains. The needle 18 is then withdrawn, leaving the plug 16 in place to seal the injury 24 according to the normal operation of the plug insertion tool 50, as shown in FIG. 6.

It will be seen from the foregoing description that the protective tip 10 must be formed of a material strong enough to withstand cutting by the strands of the steel belt 22, but light enough to cause no problem or annoyance after being discarded within the tire. Polypropylene, other plastics and Nylon are appropriate materials for manufacture of the plug 10, but the present invention is not limited to such materials. In the preferred embodiment of the invention, the material utilized to form the protective tip 10 is also somewhat flexible. The flexibility of the material in connection with the slits 14 in the wall 12 of the cone-shaped tip 10 allow the tip to collapse about the end 20 of the needle and about the shoulders 17 of the plug 16. Although a protective tip 10 without slits 14 performs the protective function described above, such a tip is somewhat limited to injuries of approximately the size of the base of the tip 10, because of the relative inflexibility of the mesh of the steel belt 22. On the other hand, if the protective tip 10 includes at least one slit 14, and is formed of a flexible material, the tip 10 will more readily collapse about the needle to fit through smaller injuries in the steel belt 22. The collapsing of the protective tip 10 also helps to force the plug 16 to conform to the size of the injury. A solid cone-shaped protective tip large enough to protect the shoulders 17 of the plug 16 would be less able to pass through smaller injuries of the type commonly found in tubeless tires unless such injuries are substantially enlarged prior to insertion of the plug.

Another embodiment of the protective tip 10 is shown in FIG. 7. The protective tip 25 shown in FIG. 7 includes a solid portion 26 in the region of the vertex 13, and in which is formed a mating cavity 28 for receiving the end 20 of the needle 18. The walls 12 of the cone extend over the shoulders 17 of the plug 16 in the same manner as in the other embodiments of the present invention disclosed herein.

Although use of the protective tip of the present invention has been described in connection with a particular injection tool, the present invention may also be effectively used with other types of needle-type plug injectors, including those which do not provide a mechanism for stretching the plug along the sides of the needle. It should also be noted that protective tips of a generally tapering configuration other than a regular cone fall within the concept of the present invention and are intended to be covered by the term "cone-shaped" as used herein.

While this invention has been described in detail with particular reference to preferred embodiments thereof, it will be understood that variations and modifications can be effected within the spirit and scope of the invention as described hereinbefore and as defined in the appended claims.

What is claimed is:

1. A shield for protecting a plug during insertion into an injury in a tubeless tire comprising:

a leading end portion having exterior surfaces converging to a leading end point for facilitating entry into an injury, and a protective wall portion extending axially from said leading end portion and defining a cavity in which an end portion of a needle-type device can be received along with a portion of a plug secured in the end portion of the needle-type device, said wall portion being collapsible relatively inwardly into retained relationship about the end portion of the needle-type device and the portion of the plug secured therein.

2. The shield of claim 1 wherein said wall portion is expandable after passing through said injury to permit the shield to be removed from the needle-type device as the device is removed from the tire.

3. A disposable protective tip for use with needle-type devices for injecting a plug into an injury in a tubeless tire comprising:

removable shielding means selectively positionable on a leading end of a needle-type device in shielding relationship to a plug carried by the needle-type device for entry into an injury passing thru a tire wall, said shielding means including a leading end portion having exterior surfaces converging to a vertex for facilitating entry into an injury, and a protective wall portion extending axially from said vertex and defining a cavity in which an end portion of the needle-type device can be received along with a portion of a plug secured in the end portion of the needle-type device, said wall portion being collapsible relatively inward into retained relationship about the end portion of the needle-type device and the portion of the plug secured therein, and subsequently expandable to be freely released from the device and plug after passing through an injury to thereby permit the shielding means to be removed from the device as the device is removed from the tire.

4. In a tubeless tire repair tool including a needle defining an eyelet therein for carrying a flexible plug, the improvement comprising:

a removable shield selectively positionable over the point of said needle, said shield including a leading end point and a trailing protective wall collapsible inwardly about said needle and plug.

5. The apparatus of claim 4 wherein said tubeless tire repair tool includes means for stretching said plug along the sides of said needle away from the eyelet of said needle.

6. The apparatus of claim 4 wherein said shield comprises a cone-shaped member for receiving the tip of said needle, said cone-shaped member extending over said needle a distance sufficient to cover said plug where said plug emerges from said eyelet.

7. The apparatus of claim 4 wherein said shield comprises a flexible cone-shaped member including at least one slit extending from the base of said cone-shaped member toward the vertex of said cone-shaped member.

8. In combination, a tire repair tool comprising a needle with an eyelet at one end thereof for receiving a flexible plug; and a shield comprising a leading pointed end and a protective wall trailing said leading pointed end, said protective wall being collapsible inwardly against said needle and plug.

* * * * *